United States Patent
Hiraoka

(10) Patent No.: US 9,720,483 B2
(45) Date of Patent: Aug. 1, 2017

(54) INFORMATION PROCESSING APPARATUS, INFORMATION PROCESSING METHOD, AND PROGRAM

(71) Applicant: CANON KABUSHIKI KAISHA, Tokyo (JP)

(72) Inventor: Takeshi Hiraoka, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/884,608

(22) Filed: Oct. 15, 2015

(65) Prior Publication Data

US 2016/0109930 A1 Apr. 21, 2016

(30) Foreign Application Priority Data

Oct. 17, 2014 (JP) ................................. 2014-213188

(51) Int. Cl.
*G06F 1/32* (2006.01)

(52) U.S. Cl.
CPC .......... *G06F 1/3237* (2013.01); *G06F 1/3215* (2013.01); *G06F 1/3253* (2013.01); *Y02B 60/1228* (2013.01); *Y02B 60/1235* (2013.01)

(58) Field of Classification Search
CPC .................................................... G06F 1/3253
See application file for complete search history.

(56) References Cited

U.S. PATENT DOCUMENTS

| | | | |
|---|---|---|---|
| 2005/0262368 A1* | 11/2005 | Cherukuri | ............. G06F 1/3209 713/324 |
| 2009/0106476 A1* | 4/2009 | Jenkins | ............... G06F 13/4221 710/315 |

FOREIGN PATENT DOCUMENTS

JP 4733877 B2 7/2011

* cited by examiner

*Primary Examiner* — Albert Wang
(74) *Attorney, Agent, or Firm* — Canon U.S.A., Inc. IP Division

(57) ABSTRACT

A bus system includes a bus module which performs data transfer between a master module and a slave module and a detection module which detects transfer of transmission data from the master module to the bus module. When the bus module is shifted to a power saving mode and then is returned from the power saving mode, a power control module delays release of the power saving mode until a plurality of data transfer requests is detected. Accordingly, a power saving effect can be improved in the bus system.

15 Claims, 14 Drawing Sheets

INFORMATION PROCESSING APPARATUS, INFORMATION PROCESSING METHOD, AND PROGRAM

BACKGROUND OF THE INVENTION

Field of the Invention

The present invention relates to power saving of a data transfer apparatus in an information processing apparatus.

Description of the Related Art

Improvements in integration degree and processing capability of a semiconductor integrated circuit increases power consumption, making power saving measures essential.

Recent semiconductor integrated circuits include a master module generating a data transfer request, a slave module responding to the data transfer request, a bus system performing data transfer, and the like. The master module includes a central processing unit (CPU), a direct memory access controller (DMAC), and the like. The slave module includes a memory controller, a static random access memory (SRAM) module, and the like. The bus system is also referred to as an interconnect, fabric, on-chip network. In the master module, power is saved by a technique referred to as dynamic voltage and frequency scaling (DVFS) for dynamically controlling power supply voltage and frequency and a technique for shutting off the power supply and clock.

Conversely, the bus system to which various master modules and slave modules are connected is often in a state in which the power and clock are constantly supplied thereto for a data transfer request from each master module, making it difficult to further reduce the power consumption. When a clock frequency is switched and on/off of the clock or the power supply is controlled to reduce power consumption, transfer data may be lost or the system may freeze unless data transfer on the bus system is completed according to a specific procedure. Methods for avoiding loss of transfer data and freezing are roughly classified into a method using a software procedure and a method using a hardware mechanism.

A method using a software procedure generally controls the clock and the power supply of the bus system after confirming that no data transfer request is issued for all the master modules connected to the bus system. In addition, a method using a bus arbitration circuit is discussed as a method using a hardware mechanism (for example, Japanese Patent No. 4733877).

In recent large-scale semiconductor integration circuits, the number of master modules exceeds 100, and many master modules are driven by an external interrupt or event. Thus, using a software procedure method, it is difficult to ensure that none of the master modules have issued a data transfer request.

In addition, when the CPU controls the clock and the power supply of the bus system, an instruction fetch and a cache module of the CPU speculatively reads program data, so that a special procedure is required to ensure that on data transfer is performed on the bus system. Consequently, if the clock and the power supply of the bus system can be controlled, the opportunity to save power is very limited.

According to the method using the hardware mechanism described in Japanese Patent No. 4733877, when currently executed processing is ended, a bus arbitration circuit which arbitrates a bus use right in response to the assertion of a clock control request signal, stops assignment of the bus use right and asserts a clock control confirmation signal. However, a bus system using a peer-to-peer data transfer interface is a mainstream in recent years, and in the hardware mechanism described in Japanese Patent No. 4733877, the bus arbitration circuit exists in the bus system. The method using the bus arbitration circuit cannot shut off the power supply to the bus system itself.

In addition, as an issue specific to the power savings of the bus system, data transfer is generated in various timings from a plurality of master modules, and a power saving period for shutting off the clock and the power supply is divided into pieces, so that a power saving effect is limited.

SUMMARY OF THE INVENTION

The present invention is directed to improvements of power saving effects by extending the period of a power saving mode of a data transfer apparatus.

A data transfer apparatus according to the present invention includes a data transfer unit configured to perform data transfer between a master module and a slave module in response to a data transfer request of the master module, a detection unit configured to detect the data transfer request of the master module, and a control unit configured to control the data transfer unit from a normal operation mode to a power saving mode and to return the data transfer unit from the power saving mode to the normal operation mode, wherein, in a case where a first data transfer request of the master module is detected and then a second data transfer request of the master module is detected by the detection unit after the data transfer unit is shifted from the normal operation mode to the power saving mode by the control unit, the control unit returns the data transfer unit from the power saving mode to the normal operation mode, and the data transfer unit collectively transmits the first data transfer request and the second data transfer request to the slave module and collectively performs data transfer processing corresponding to the first data transfer request and data transfer processing corresponding to the second data transfer request.

Further features of the present invention will become apparent from the following description of exemplary embodiments with reference to the attached drawings.

DESCRIPTION OF THE EMBODIMENTS

An information processing apparatus according to exemplary embodiments of the present invention will be described in detail below with reference to the drawings. The exemplary embodiments described below are merely examples and do not limit the scope of the invention.

[Configuration of Apparatus]

Figure 1:
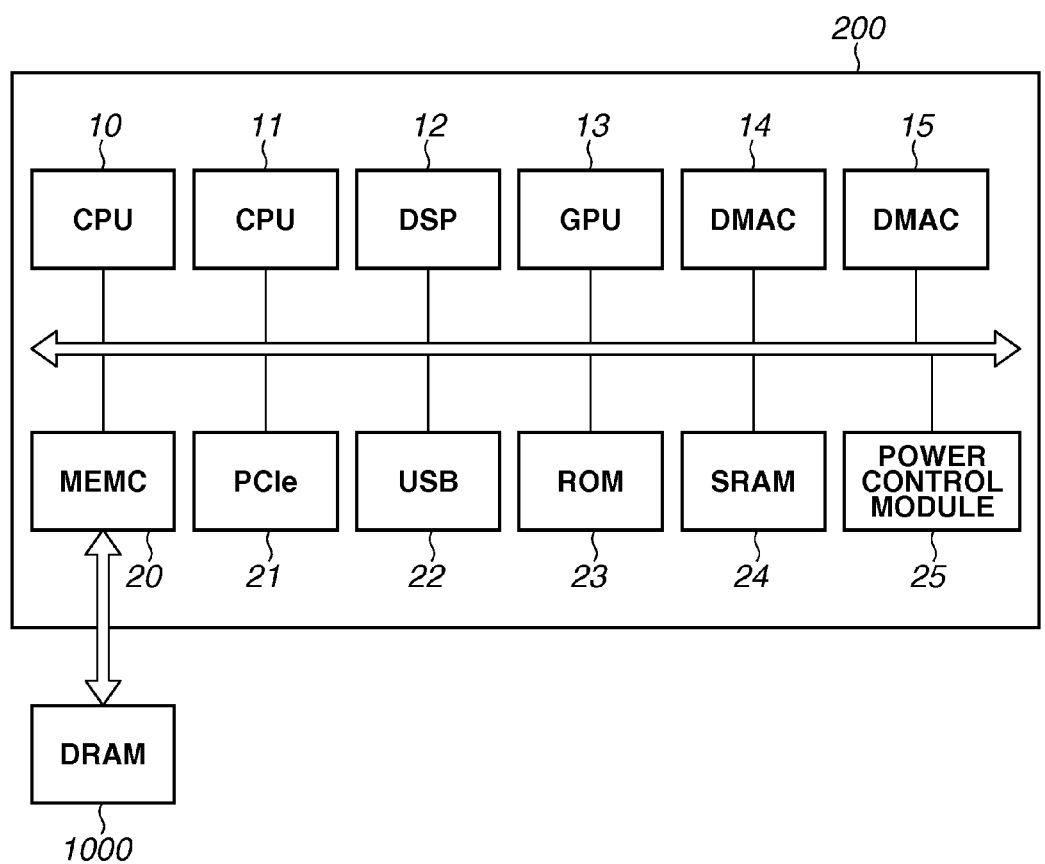
FIG. 1 is a block diagram illustrating a configuration example of an information processing apparatus.

A configuration example of an information processing apparatus 200 is described with reference to a block diagram in FIG. 1.

The information processing apparatus 200 includes a bus system 30 controlling data transfer. A plurality of CPU 10 and CPU 11, a digital signal processor (DSP) 12, a graphics processing unit (GPU) 13, and the like are connected to the bus system 30 as processors. A plurality of DMAC 14 and DMAC 15, a memory controller (MEMC) 20, and the like are connected to the bus system 30 as data transfer controllers. For example, a Peripheral Component Interconnect Express (PCIe) controller 21 and a Universal Serial Bus (USB) controller 22 for connecting peripheral devices, not illustrated, are connected to the bus system 30. A read-only memory (ROM) 23, an SRAM 24, and the like are connected to the bus system 30 as memories. A power control module 25 is also connected to the bus system 30.

The MEMC 20 is connected to a dynamic random access memory (DRAM) 1000 external to the information processing apparatus 200. The CPU 10 executes a program stored in the ROM 23 using the DRAM 1000 as a work memory. The configuration of the information processing apparatus 200 illustrated in FIG. 1 is a representative configuration of a semiconductor device referred to as a system-on-chip. The bus system 30 controlling data transfer is referred to as an interconnect, fabric, on-chip network or a network-on-chip.

The CPU 10, the CPU 11, the DSP 12, the GPU 13, the DMAC 14 and the DMAC 15 are a group of modules for issuing a data transfer request and may be collectively referred to as a "master module" 300 below. On the other hand, the MEMC 20, the PCIe 21, the USB 22, the ROM 23, the SRAM 24, and the power control module 25 are a group of modules for responding after receiving the data transfer request and may be collectively referred to as a "slave module" 400 below. There is a module having both functions of issuing and responding to a data transfer request, however, it is not illustrated in the drawings.

[Bus System and Power Control Module]

A configuration example of the bus system 30 and the power control module 25 is described with reference to a block diagram in FIG. 2.

Since the number of the master modules 300 and the slave modules 400 connected to the bus system 30 increases, the bus system 30 recently includes a plurality of data transfer apparatuses (hereinbelow, referred to as a bus module) 100 for controlling data transfer in terms of physical timing convergence. The bus system 30 includes data transfer detection modules 101 corresponding to each of the bus modules 100. The bus system 30 can further include other modules, such as a debug module, however, descriptions of the other modules are omitted in the present exemplary embodiment.

Each bus module 100 illustrated in FIG. 2, details of which are described below, basically includes one power control interface (hereinbelow, referred to as the power control I/F) and a plurality of data transfer control interfaces (hereinbelow, referred to as the data transfer controls I/F). The bus module 100 is connected to the master module 300, the slave module 400, and other bus modules 100 via the data transfer control I/F and connected to a corresponding power control module 253 via the power control I/F. Each bus module 100 illustrated in FIG. 2 is controlled by each corresponding power control module 253, and methods for controlling the bus modules may be the same or different. For example, setting values of an interval timer 251 and a return delay timer 252 included in each power control module 253 may be the same or different each other. In addition, a part of the power control modules 253 may not include the interval timer 251 and/or the return delay timer 252. Further, the bus system 30 illustrated in FIG. 2 includes three bus modules 100, however, the number of the bus modules 100 can be changed.

Figure 3:
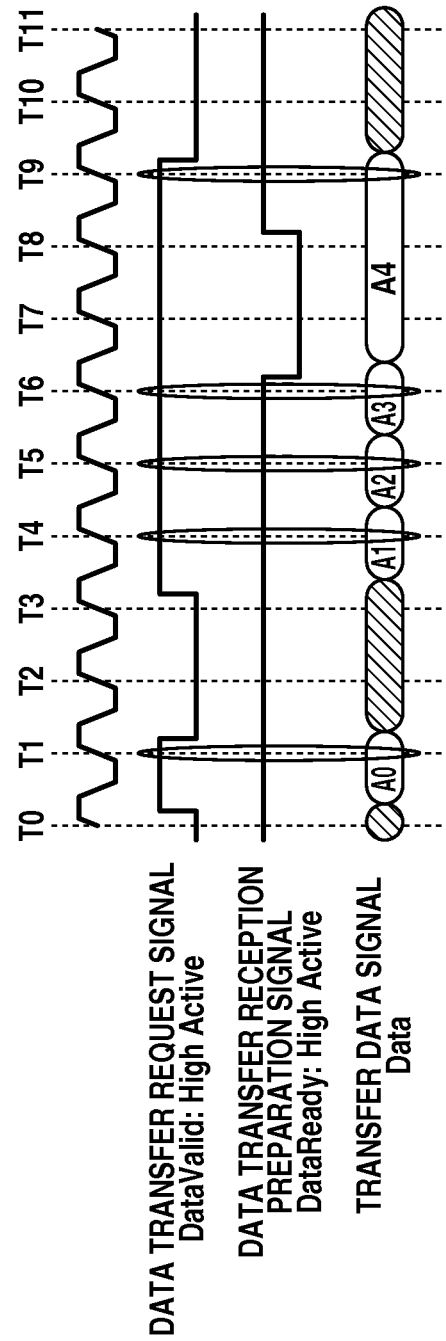
FIG. 3 illustrates data transfer.

Data transfer is described with reference to FIG. 3. Data is transferred by a two-line handshake protocol of a data transfer request signal and a data transfer reception preparation signal. A module for transmitting data (hereinbelow, referred to as the transmission module) drives signal lines of the data transfer request signal and transfer data, and a module for receiving data (hereinbelow, referred to as the reception module) drives the data transfer reception preparation signal. When both of the data transfer request signal and the data transfer reception preparation signal are active, the data transfer is established. When the data transfer request signal and the data transfer reception preparation signal are in a high level (H level), they are active (high active).

Between each bus module 100 and the power control module 25, three power control signals, namely a power saving mode transition request signal, a power saving mode response signal, and a power saving mode permission signal are communicated with each other via the power control I/F, which is described in detail below. However, the power saving mode permission signal is transmitted from each bus module 100 to the power control module 25 via the data transfer detection module 101.

The power control module 25 outputs a power saving mode transition request signal for requesting a transition to the power saving mode, and the bus module 100 outputs a power saving mode response signal. A power saving mode permission signal indicating whether the transition to the power saving mode is permitted or not is a logical sum signal of the output signal of the bus module 100 and a detection result of the data transfer detection module 101. In this regard, the power control signal is active (low active) when being in a low level (L level).

In the power saving mode, a power supply and a clock of the bus module 100 are in a stop state or a changed state. On the other hand, the data transfer detection module 101 functions as a part of the bus module 100, but its power supply is independent of that of the bus module 100, so that the data transfer detection module 101 can set a state of the power saving mode permission signal regardless of whether the bus module 100 is in the power saving mode or not.

A configuration example of the bus module 100 and the data transfer detection module 101 is described with reference to a block diagram in FIG. 4.

The bus module 100 includes a plurality of slave data transfer control I/Fs 501 for receiving transfer data, a plurality of master data transfer control I/Fs 506 for transmitting the transfer data to a following stage, and a power control I/F 500. Data received by the slave data transfer control I/F 501 may be stored in a first-in first-out (FIFO) memory 502.

An address decode circuit 503 analyzes a transfer destination of data output from the slave data transfer control I/F 501 or the FIFO 502 and transmits a data transfer request to an arbitration circuit 504 corresponding to the transfer destination. The arbitration circuit 504 arbitrates to select one of the data transfer requests and outputs an arbitration result to a selection circuit 505 and the master data transfer control I/F 506.

The selection circuit 505 selects the transfer data based on the arbitration result and outputs the selected transfer data to the master data transfer control I/F 506. The master data transfer control I/F 506 receives the arbitration result and the selected transfer data and transmits and receives data to and from the bus module 100 or the slave module 400 in the following stage.

On the other hand, when a power saving mode transition request signal is received from the power control module 25, the power control I/F 500 outputs an inactive data transfer reception preparation signal to each slave data transfer control I/F 501 to indicates the transition to the power saving mode. The slave data transfer control I/F 501 outputs the data transfer reception preparation signal to the transmission module (the master module 300 or the bus module 100) in a preceding state and shifts to a state in which transfer data is not newly received (hereinbelow, referred to as the non-reception state).

Next, the power control I/F 500 detects a processing state in the bus module 100. When it is detected that processing is in progress, the power control I/F 500 maintains the power saving mode response signal in the H level (inactive). The power control I/F 500 determines the processing state in the bus module 100 using, for example, information about an empty state of the FIFO 502 and information about the number of outstanding transfer data pieces (response state management of the slave module 400).

Figure 4:
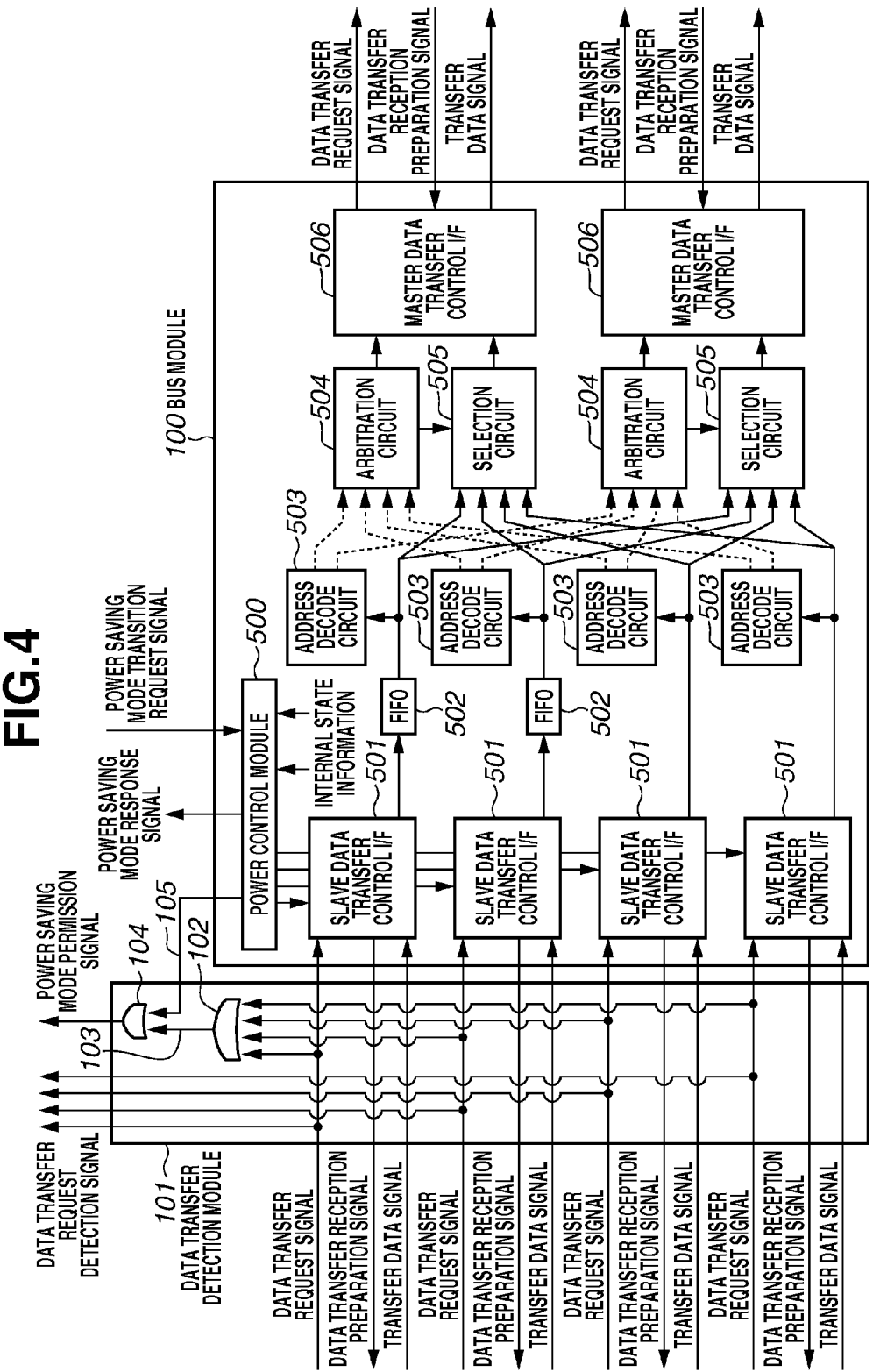
FIG. 4 is a block diagram illustrating a configuration example of a bus module and a data transfer detection module.

Although only a part of transfer data pieces are illustrated in FIG. 4, actual transfer data pieces include request data, write data, read data, and response data, and the data pieces are transferred via different circuits. Regarding address data and write data, the master module 300 or the bus module 100 is a driving module of the data transfer request signal. On the other hand, regarding read data and response data, the slave module 400 or the bus module 100 is a driving module of the data transfer request signal.

Figure 5:
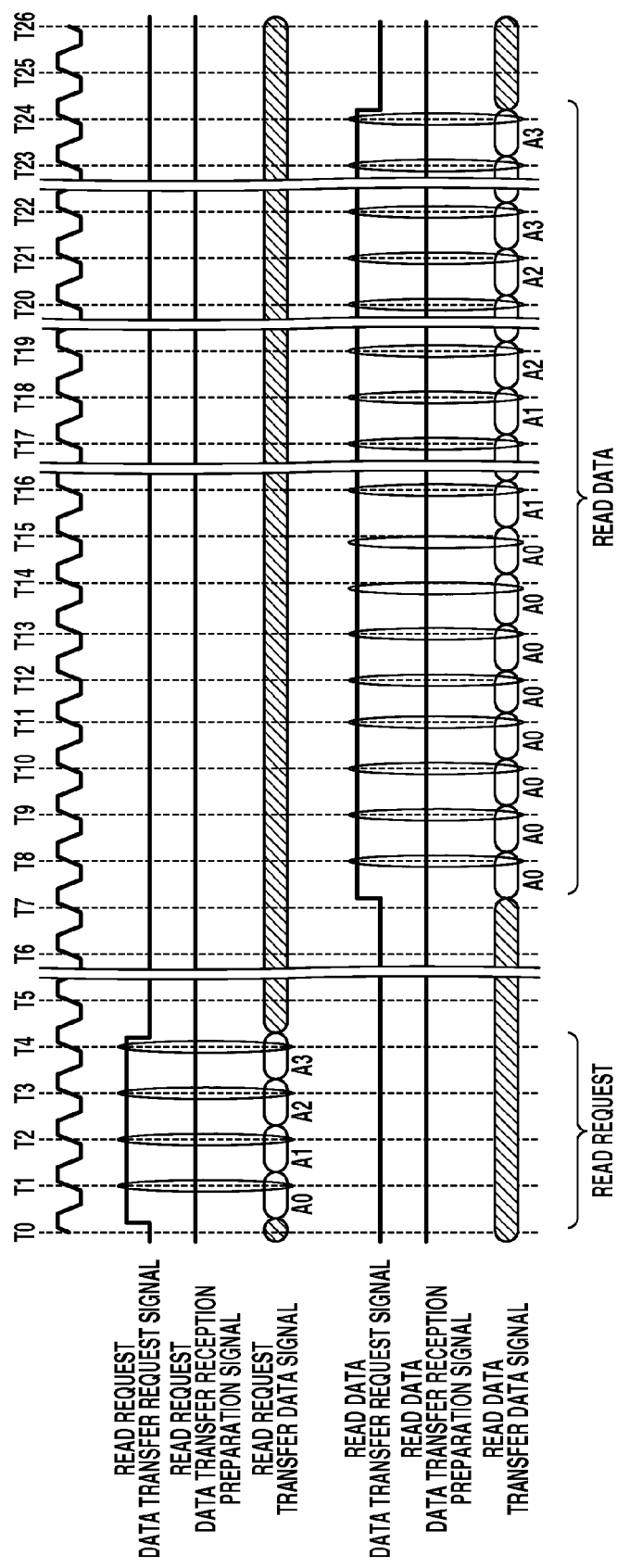
FIG. 5 illustrates transfer of read data.

An example of transfer of read data is illustrated in FIG. 5. In FIG. 5, a relationship of a read request and read data with respect to a data transfer request signal and a data transfer reception preparation signal. Data such as address information and a burst length included in the read request is subjected to transfer processing every time corresponding data transfer request signal and data transfer reception preparation signal are established (time T1 to T4). After a certain time period has elapsed, read data transfer processing is performed every time the corresponding data transfer request signal and data transfer reception preparation signal are established (time T8 to T23). In other words, the read request and the read data are each transferred as a transfer data signal by the two-line handshake protocol of the data transfer request signal and the data transfer reception preparation signal.

A logical sum (OR) gate 102 of the data transfer detection module 101 outputs a logical sum signal 103 which is a logical sum of the data transfer request signals received by each of the slave data transfer control I/Fs 501. To a logical sum (OR) gate 104, the logical sum signal 103 and a signal 105 are input. The signal 105 is in the L level (active) when the bus module 100 determines that the bus module 100 itself is not executing processing (data is not being transferred or transfer data processing is completed). The logical sum (OR) gate 104 outputs a logical sum of the logical sum signal 103 and the signal 105 as a power saving mode permission signal. When there is no data transfer request, the logical sum signal 103 is in the L level (active), and when the bus module 100 is not executing processing, the signal 105 is in the L level (active) and the power saving mode permission signal is in the L level (active). In addition, the data transfer request signal received by each slave data transfer control I/F 501 is notified to the power control module 25 as a data transfer request detection signal.

Case when Transition to Power Saving Mode is Permitted

Operations of the power control module 25 and the bus module 100 when the transition to the power saving mode is permitted are described with reference to FIG. 6.

When a trigger for the transition to the power saving mode is received, the power control module 25 activates the power saving mode transition request signal (time T2).

When the power saving mode transition request signal is detected as active (time T3), the bus module 100 inactivates the data transfer reception preparation signal (time T4) and shifts to the non-reception state to detect the processing state. When it is detected that processing is not being executed (absence of transfer data) (time T5), the bus module 100 sets the signal 105 to the L level (active) (time T5) and activates the power saving mode response signal (time T6).

Figure 6:
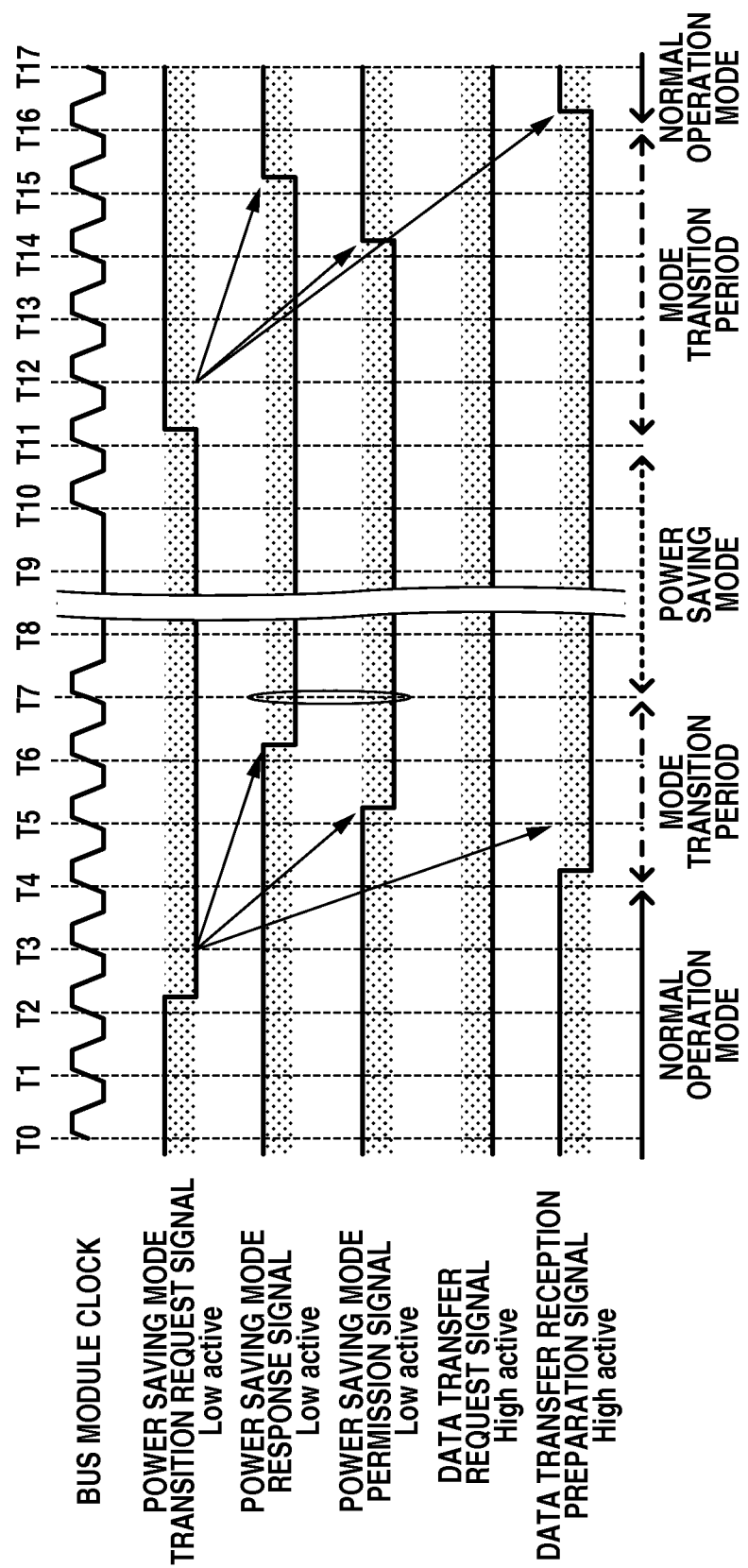
FIG. 6 illustrates operations of the power control module and the bus module when transition to a power saving mode is permitted.

In the example in FIG. 6, the data transfer request signal is inactive, and the logical sum signal 103 is in the L level, thus it indicates that new transfer data does not exist. Accordingly, the logical sum signal 103 and the signal 105 are both in the L level, and the power saving mode permission signal output by the logical sum (OR) gate 104 is in the L level (active) at time T5.

When the power saving mode response signal is detected as active (time T7), the power control module 25 determines the power saving mode permission signal. When the power saving mode permission signal is detected as active (time T7), the power control module 25 determines that the bus module 100 permits the transition to the power saving mode and changes or shuts off the clock and the power supply of the bus module 100 (time T8 to T10).

Next, when a trigger for the transition to a normal operation mode is received, the power control module 25 supplies the clock and the power to the bus module 100 and then inactivates the power saving mode transition request signal (time T11).

When the power saving mode transition request signal is detected as inactive (time T12), the bus module 100 sets the signal 105 to the H level (time T14) and inactivates the power saving mode permission signal. The bus module 100 inactivates the power saving mode response signal (time T15) and then activates the data transfer reception preparation signal (time T16) to be a state to newly receive transfer data by releasing the non-reception state.

Case when Transition to Power Saving Mode is not Permitted

Operations of the power control module 25 and the bus module 100 when the transition to the power saving mode is not permitted are described with reference to FIG. 7.

When a trigger for the transition to the power saving mode is received, the power control module 25 activates the power saving mode transition request signal (time T2).

When the power saving mode transition request signal is detected as active (time T3), the bus module 100 inactivates the data transfer reception preparation signal (time T4) and shifts to the non-reception state to detect the processing state. When it is detected that processing is being executed (presence of transfer data) (time T5), the bus module 100 maintains the signal 105 in the H level (time T5) and activates the power saving mode response signal (time T6).

Figure 7:
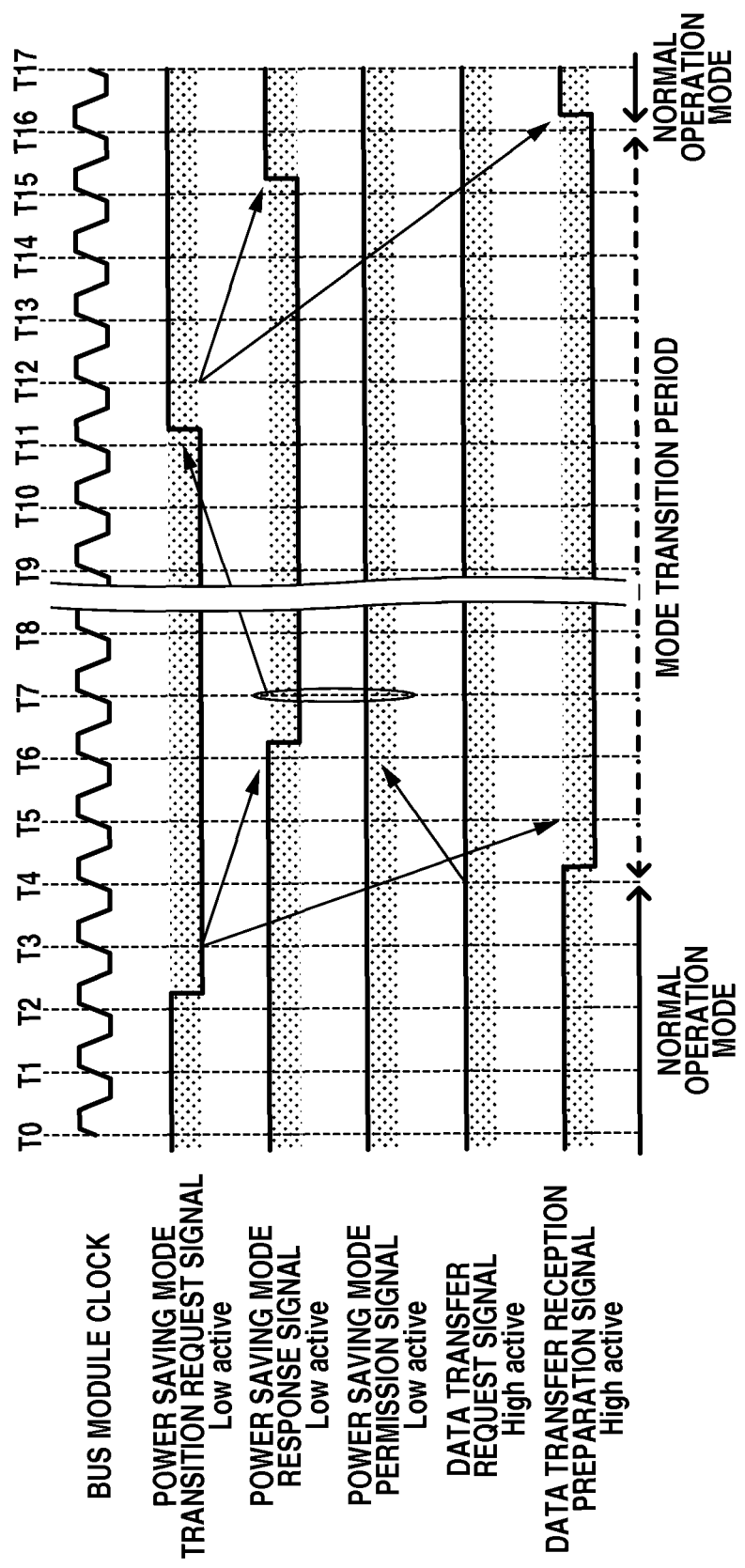
FIG. 7 illustrates operations of the power control module and the bus module when transition to the power saving mode is not permitted.

In the example in FIG. 7, the data transfer request signal is active, and the logical sum signal 103 is in the H level, thus it indicates that new transfer data exists. In this example, both of the logical sum signal 103 and the signal 105 are in the H level, and the power saving mode permission signal output by the logical sum (OR) gate 104 is in the H level (inactive) at time T5. Then, even if the processing of the transfer data of the bus module 100 is completed (processing is not being executed), and the signal 105 becomes in the L level, the power saving mode permission signal is inactive as long as the data transfer request signal is active and the logical sum signal 103 is maintained in the H level.

When the power saving mode response signal is detected as active (time T7), the power control module 25 determines the power saving mode permission signal. When the power saving mode permission signal is detected as inactive (time T7), the power control module 25 determines that the bus module 100 does not permit the transition to the power saving mode and inactivates the power saving mode transition request signal (time T11) to cancel the power saving mode transition request.

When the power saving mode transition request signal is detected as inactive (time T12), the bus module 100 inactivates the power saving mode response signal (time T15). Then, the bus module 100 activates the data transfer reception preparation signal (time T16) and continues the processing of the transfer data by releasing the non-reception state.

Case when New Transfer Data is Generated after Transition to Power Saving Mode

Operations of the power control module 25 and the bus module 100 when new data transfer is generated after the transition to the power saving mode are described with reference to FIG. 8.

When a trigger for the transition to the power saving mode is received, the power control module 25 activates the power saving mode transition request signal (time T2).

When the power saving mode transition request signal is detected as active (time T3), the bus module 100 inactivates the data transfer reception preparation signal (time T4) and shifts to the non-reception state to detect the processing state. When it is detected that processing is not being executed (absence of transfer data) (time T5), the bus module 100 sets the signal 105 to the L level (time T5) and activates the power saving mode response signal (time T6). Since the power saving mode response signal is low active, logic levels of the signal 105 and the power saving mode response signal are the same.

Figure 8:
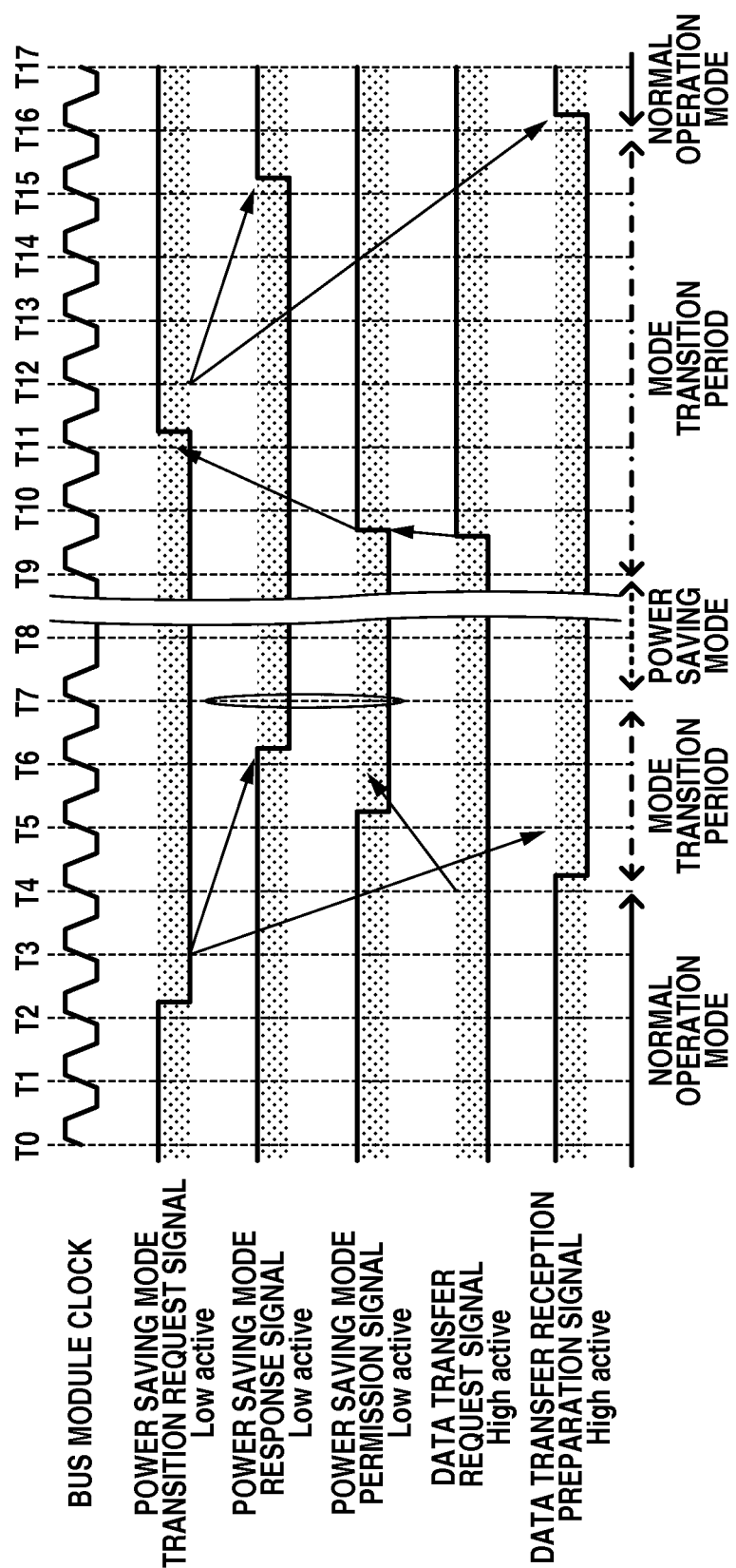
FIG. 8 illustrates operations of the power control module and the bus module when data transfer is newly generated after shifting to the power saving mode.

In the example in FIG. 8, at time T5, the data transfer request signal is inactive, and the logical sum signal 103 is in the L level, thus it indicates that new transfer data does not exist. Accordingly, the logical sum signal 103 and the signal 105 are both in the L level, and the power saving mode permission signal output by the logical sum (OR) gate 104 becomes active at time T5. In other words, when new transfer data does not exist, and the bus module 100 is not executing processing, the power saving mode permission signal becomes active.

When the power saving mode response signal is detected as active (time T7), the power control module 25 determines the power saving mode permission signal. When the power saving mode permission signal is detected as active (time T7), the power control module 25 determines that the bus module 100 permits the transition to the power saving mode and changes or shuts off the clock and the power supply of the bus module 100 (time T8 to T10).

In the example in FIG. 8, at time T9, new transfer data is generated, and a state of the data transfer request signal is changed to active. Since the bus module 100 is in the power saving mode, the signal 105 is maintained in the L level at time T9, but the logical sum signal 103 output by the logical sum (OR) gate 102 of the data transfer detection module 101 becomes in the H level at time T9. Accordingly, the power saving mode permission signal output by the logical sum (OR) gate 104 becomes inactive at time T9.

When it is detected that the power saving mode permission signal being received is inactive (time T10), the power control module 25 determines that the bus module 100 needs to be released from the power saving mode. Thus, the power control module 25 supplies the clock and the power to the bus module 100 and then inactivates the power saving mode transition request signal (time T11).

When the power saving mode transition request signal is detected as inactive (time T12), the bus module 100 inactivates the power saving mode response signal (time T15). Then, the bus module 100 activates the data transfer reception preparation signal (time T16) and starts reception of new transfer data by releasing the non-reception state.

According to the operations of the power control module 25 and the bus module 100 illustrated in FIGS. 6 to 8, the transition between the power saving mode and the normal operation mode can be realized while avoiding loss of transfer data and freezing in the bus system 30 including a plurality of bus modules 100.

Power Control Module

Figure 2:
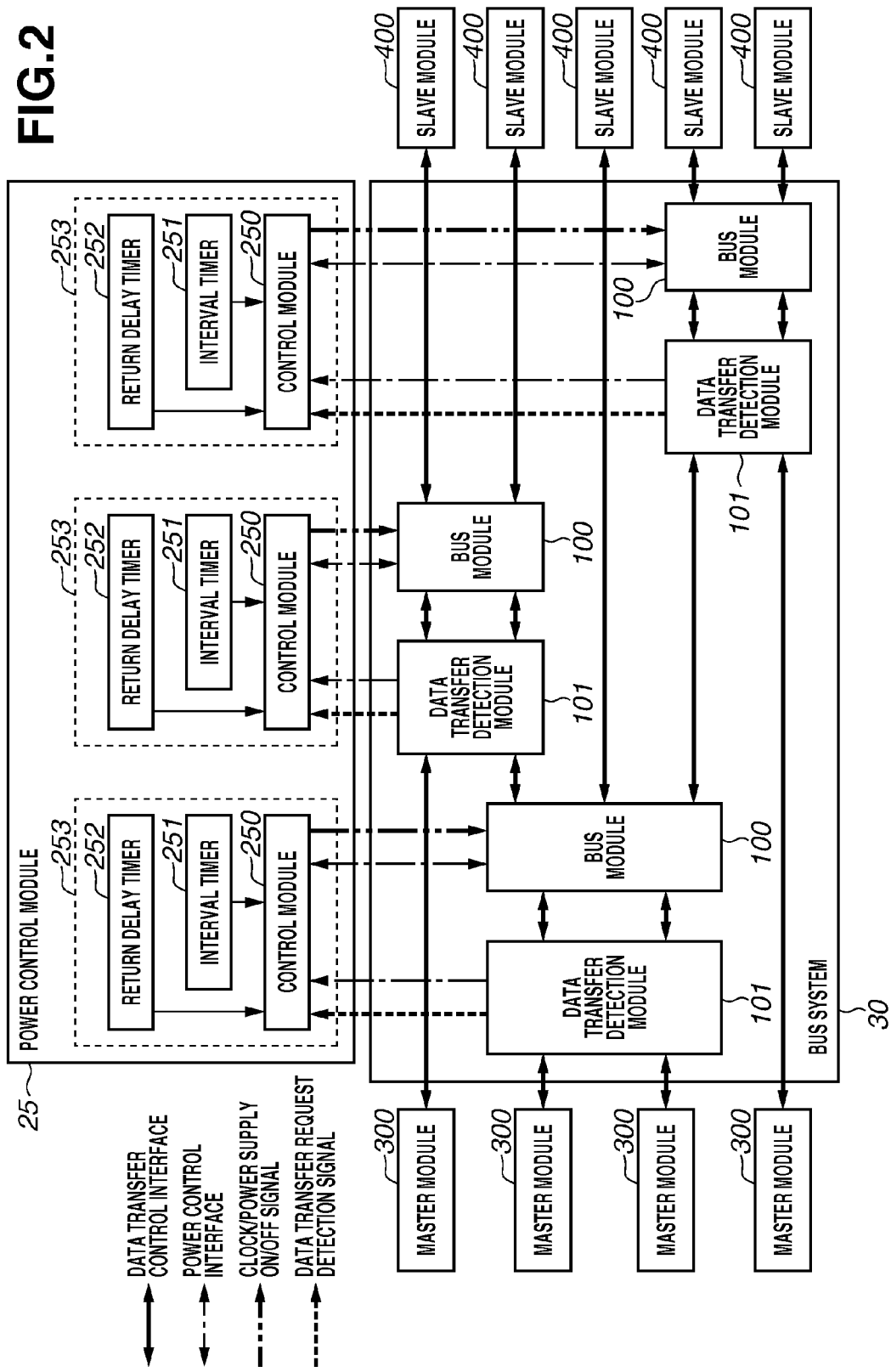
FIG. 2 is a block diagram illustrating a configuration example of a bus system and a power control module.

As illustrated in FIG. 2, the power control module 25 includes the power control units 253 corresponding to each bus module 100. Each power control unit 253 includes a control module 250 for controlling transition to and return from the power saving mode, the interval timer 251, and the return delay timer 252 and manages a state of the corresponding bus module 100. Each power control unit 253 is realized by the interval timer 251, the return delay timer 252, and a simple circuit dedicated to control. Alternatively, each power control unit 253 is realized by the CPU of the power control module executing a program stored in the ROM of the power control module 25.

Figure 9:
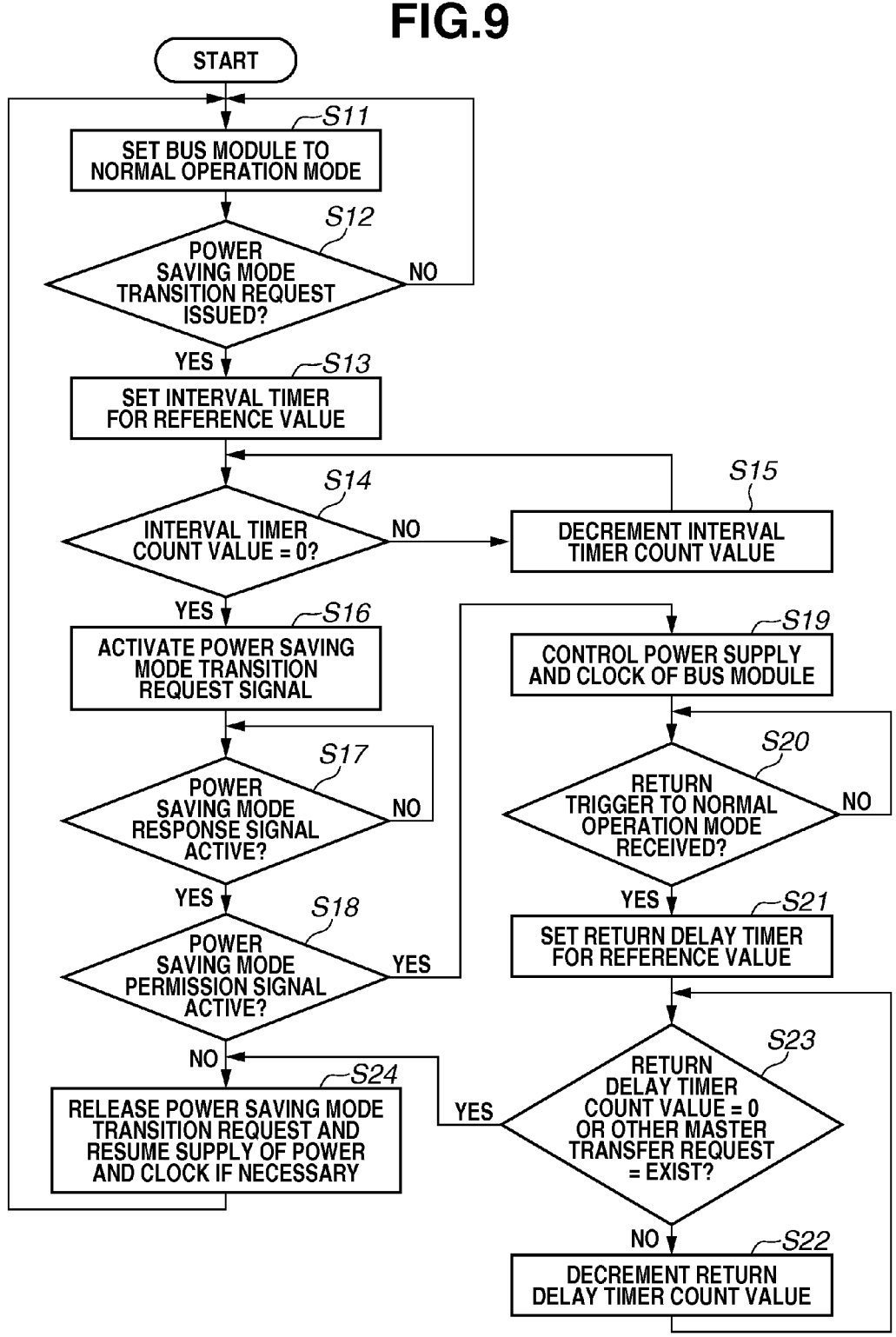
FIG. 9 is a flowchart illustrating operations of a control module.

Processing by the control module 250 is described with reference to a flowchart illustrated in FIG. 9.

In step S11, when the power control module 25 starts operations, the control module 250 supplies the power and the clock to the bus module 100 and sets the bus module 100 to the normal operation mode. At that time, the power saving mode transition request signal is inactive.

Next, in step S12, the control module 250 determines whether a trigger for the transition to the power saving mode is received. When the trigger is not received (NO in step S12), the control module 250 returns the processing to step S11 and maintains the bus module 100 in the normal operation mode. The trigger for the transition to the power saving mode is based on register access, an interrupt, and an external event by the CPU 10 and the CPU 11 or based on an internal state of the control module 250 itself.

When the trigger for the transition to the power saving mode is received (YES in step S12), in step S13, the control module 250 sets a reference value to the count value of the interval timer, and in step S14, the control module 250 determines a count value of the interval timer 251. When the count value is greater than zero (NO in step S14), in step S15, the control module 250 decrements the count value of the interval timer 251 and returns the processing to step S14.

When the count value of the interval timer 251 is zero (YES in step S14), in step S16, the control module 250 activates the power saving mode transition request signal and determines whether the bus module 100 permits the transition to the power saving mode. More specifically, in step S17, the control module 250 performs determination of the power saving mode response signal and determination of the power saving mode permission signal.

When the power saving mode response signal is active (YES in step S17), in step S18, the control module 250 determines whether the power saving mode permission signal is active. When the power saving mode permission signal is active (YES in step S18), the control module 250 determines that the bus module 100 permits the transition to the power saving mode. Then, in step S19, the control module 250 brings the bus module 100 into the power saving mode by controlling the power supply and the clock of the bus module 100. Shutoff of the power supply and the clock, a change in a clock speed, and the like are performed in consideration of a return time and a response performance from the power saving mode to the normal operation mode. Then, the control module 250 advances the processing to step S20 and enters a state for waiting a return trigger to the normal operation mode of the bus module 100.

On the other hand, If the power saving mode response signal is active (YES in step S17), but it is determined that the power saving mode permission signal is inactive (NO in step S18), the control module 250 determines that the bus module 100 does not permit the transition to the power saving mode. Thus, the control module 250 advances the processing to step S24. When transfer data being processed exists or when new transfer data exists in the bus module 100, the bus module 100 does not permit the transition to the power saving mode so as to avoid loss of the transfer data and freezing.

After shifting the bus module 100 to the power saving mode, in step S20, the control module 250 determines whether a return trigger to the normal operation mode is received. There are several types of return triggers including register access, an interrupt, and an external event by the CPU 10 and the CPU 11 and an internal event of the control module 250. In addition, when new transfer data is generated, since the bus module 100 is in the power saving mode, the power saving mode permission signal is inactivated by the data transfer detection module 101 which is one of the return trigger. When the return trigger is received (YES in step S20), the control module 250 advances the processing to step S21.

When return processing from the power saving mode is performed, in step S21, the control module 250 sets a predetermined reference value to the return delay timer 252. In step S23, when a value of the return delay timer 252 is zero, or a plurality of data transfer request detection signals notified from the data transfer detection module 101 is active (YES in step S23), in step S24, the control module 250 performs the return processing from the power saving mode. If not (NO in step S23), in step S22, the control module 250 decrements the value of the return delay timer 252, and in step S23, the control module 250 determines again whether the condition for the return from the power saving mode is satisfied.

In step S24, if the power and the clock are not supplied to the bus module 100 when the return processing is performed, the control module 250 resumes supply of the power and the clock and cancels the power saving mode transition request. When the bus module 100 is returned from the shutoff of the power supply, reset processing of the bus module 100 is performed after the power supply becomes stable. Then, in step S24, the control module 250 inactivates the power saving mode transition request signal, confirms that the power saving mode response signal is inactive, and then advances the processing to step S11.

Next, in step S12, the control module 250 determines whether to issue again the power saving mode transition request, and when the power saving mode transition request is not issued (NO in step S12), the control module 250 returns the processing to step S11. Whereas, when the power saving mode transition request is issued (YES in step S12), in step S13, the control module 250 sets the predetermined reference value to the count value of the interval timer 251 and advances the processing to step S14.

According to the above-described processing by the control module 250, power saving of the bus module 100 can be realized while reducing procedures related to power control by the master modules 300 of the CPU 10 and the CPU 11.

Count Value of Interval Timer

Figure 10:
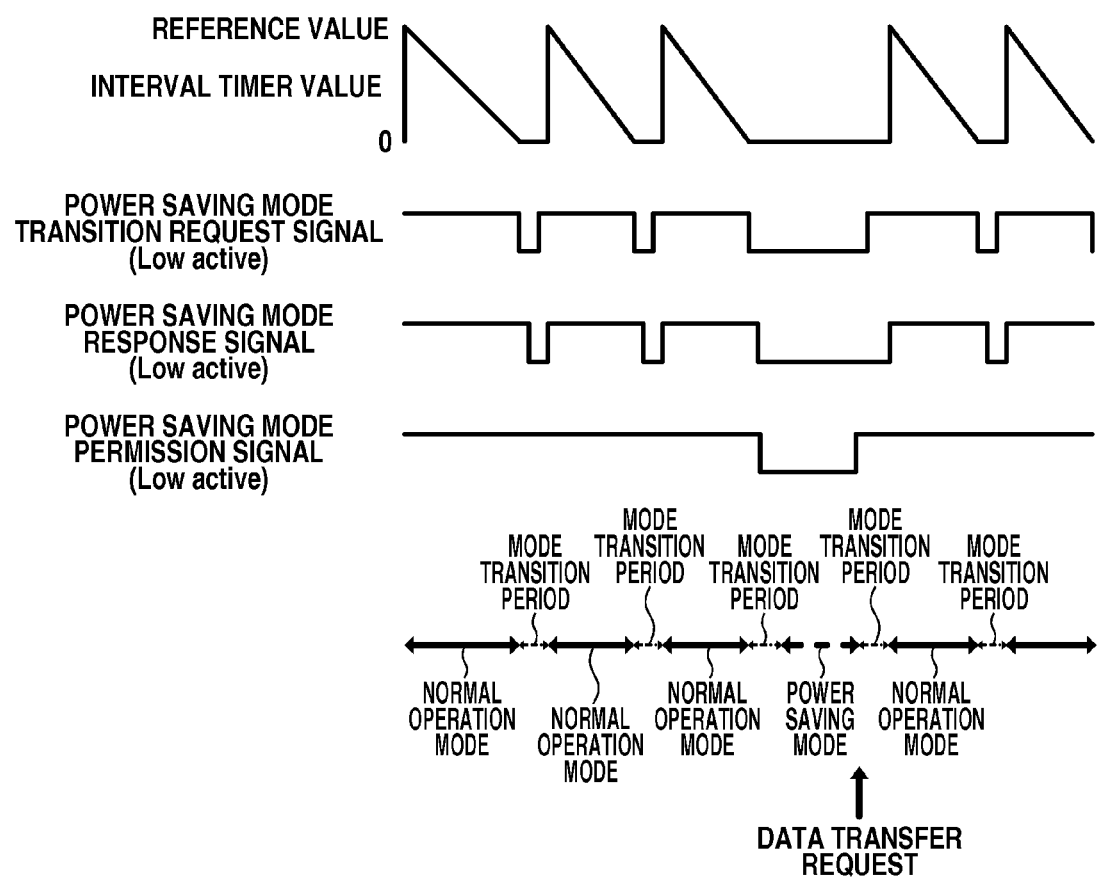
FIG. 10 illustrates a relationship between a power control signal and a count value of an interval timer.

A relationship between a power control signal and a count value of the interval timer 251 is described with reference to FIG. 10.

A situation in which the power saving mode transition request signal becomes active, and then the power saving mode response signal becomes active, but the power saving mode permission signal does not become active is a case when the bus module 100 does not permit the transition to the power saving mode as described above. In this case, the power control module 25 inactivates the power saving mode transition request signal and activates the power saving mode transition request signal again after a time period set to the interval timer 251 elapsed. In other words, the power control module 25 makes the power saving mode transition request at an interval set to the interval timer 251 without interventions of the CPU 10 and the CPU 11.

In a mode transition period for avoiding loss of the transfer data and freezing, the bus module 100 determines whether the transition to the power saving mode is possible and, if it is possible, notifies the power control module 25 of that effect. The power control module 25 can shift to the power saving mode by controlling the power supply and the clock only in the situation in which the transition to the power saving mode is possible and realize the power saving of the bus module 100.

The power control module 25 includes a plurality of interval timers 251 corresponding to a plurality of bus modules 100. A value of each interval timer 251 is set in advance according to a transfer performance request of the bus module 100 as a control target. To the interval timer 251 corresponding to the bus module 100 having low data transfer capability, such as a low transfer band request, a low value is set to increase opportunities to shift to the power saving mode.

On the other hand, to the interval timer 251 corresponding to the bus module 100 having a high transfer band request, a high value is set to decrease opportunities to reduce an effective performance by the power saving mode transition period. Similarly, a value of the interval timer 251 may be set in consideration of a request for transfer latency not only by the request for the transfer band. In other words, an optimum balance can be obtained between the effective performance of transfer and the power consumption in consideration of usage conditions of each bus module 100. The transfer latency may be obtained by calculating from a required transfer band.

Count Value of Return Delay Timer

It is assumed that two master modules 300 issue two transfer requests. A relationship between the power saving mode and a count value of the return delay timer is described using an example when read requests A and B each having an eight burst length are issued four pieces each as an example of the two transfer requests. A predetermined time for delaying a return is set using the count value (the number of cycles) of the return delay timer. It is assumed that a read latency is 400 cycles, and read data pieces A and B return from the slave module 400 to the bus module 100 after 400 cycles have elapsed. Regarding the power control module 25, it is assumed that the reference value of the return delay timer is set to 600, and the power control module 25 performs setting to return the bus module 100 from the power saving mode when a second transfer request is recognized.

Figure 11:
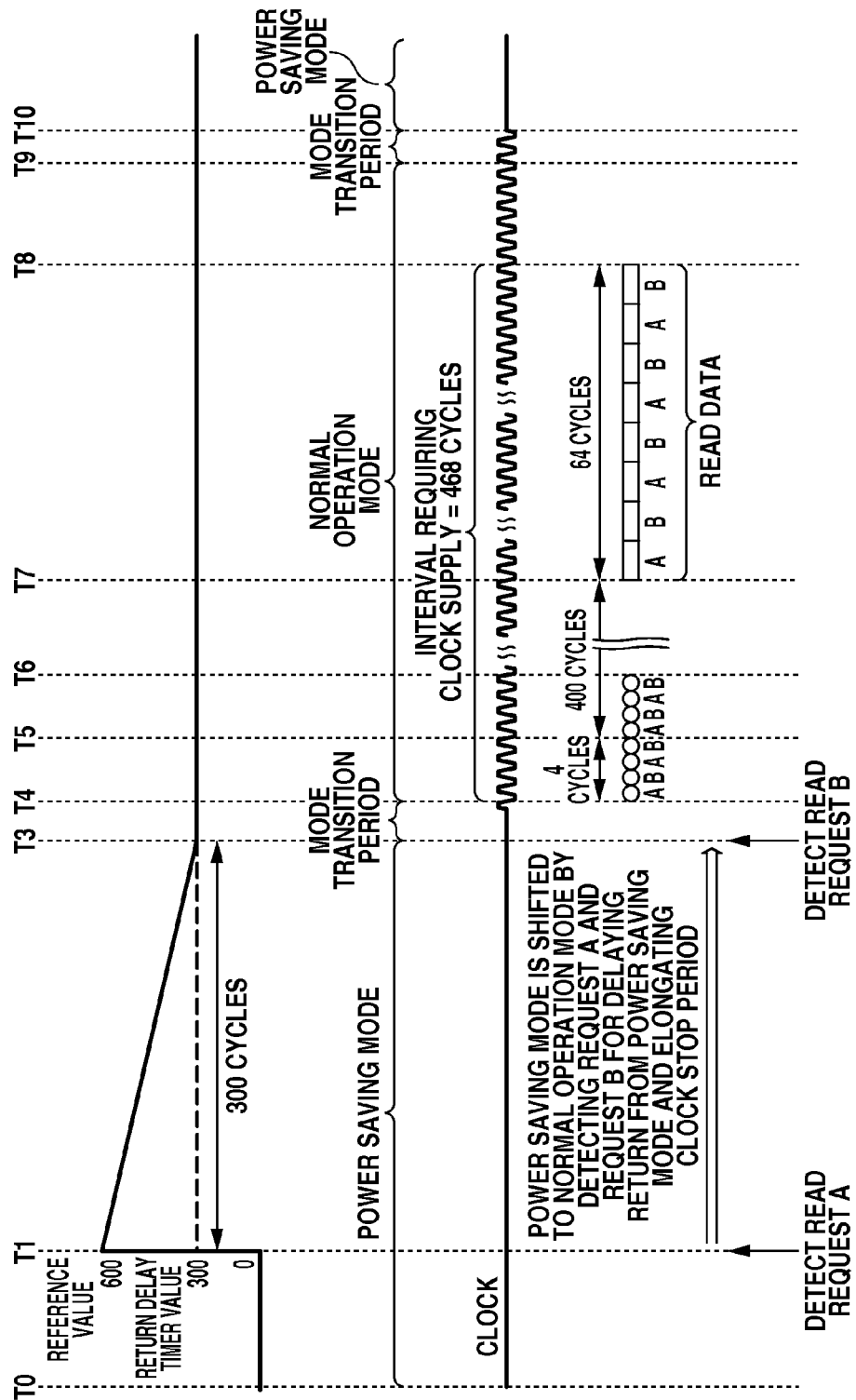
FIG. 11 illustrates a case when a return to a normal mode is delayed until transfer requests are generated from two master modules regarding a return from the power saving mode to the normal mode.
Figure 12:
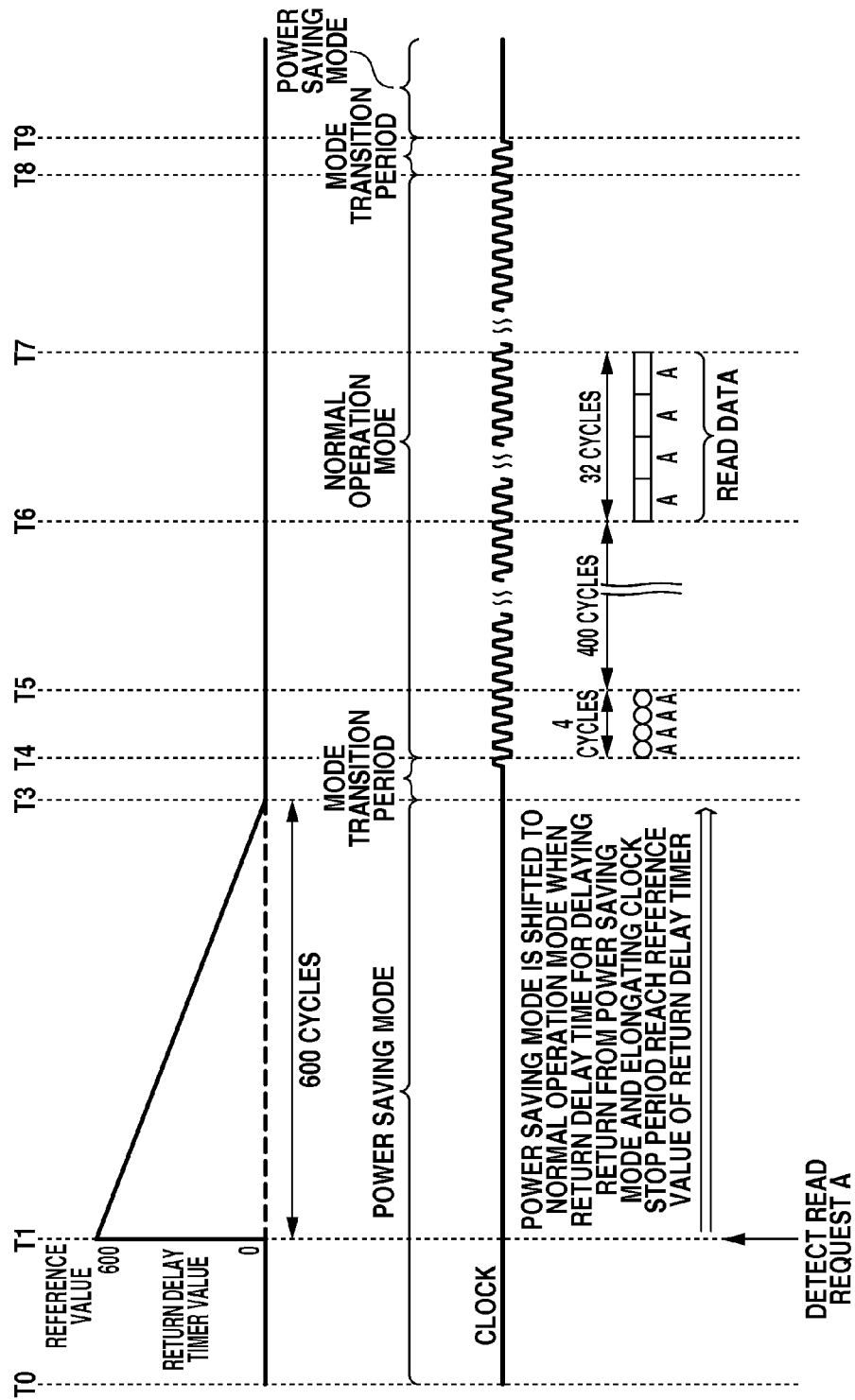
FIG. 12 illustrates a case when a return to the normal mode is delayed to a reference value of a return delay timer regarding the return from the power saving mode to the normal mode.

FIG. 11 illustrates an example when the second transfer request is generated by the time the count value of the return delay timer 252 reaches zero, and FIG. 12 illustrates an example when the second transfer request is not generated by the time the count value of the return delay timer 252 reaches zero.

Regarding the return from the power saving mode to the normal mode, a case when the return to the normal mode is delayed until data transfer of another master module 300 is generated is described with reference to FIG. 11. When the data transfer detection module 101 detects the read request A at time T1, the data transfer detection module 101 requests the transition from the power saving mode to the normal mode from the power control module 25 using the fact that the power saving mode permission signal becomes inactive.

When the transition request is received, the power control module 25 sets the reference value of the return delay timer to 600 and start decrement of the return delay timer (time T1). In this example, the return delay timer measures time and when 300 cycles have elapsed, the read request B of another master module 300 is generated (time T3). When the read request B is detected via the data transfer request detection signal (time T3), the power control module 25 resumes the clock and then shifts the bus module 100 to the normal mode (time T4). Then, the bus module 100 performs processing of the read requests A and B (time T4 to T8).

Regarding the return from the power saving mode to the normal mode, a case when the return to the normal mode is delayed to the reference value of the return delay timer is described with reference to FIG. 12. When the data transfer detection module 101 detects the read request A at time T1, the data transfer detection module 101 requests the transition from the power saving mode to the normal mode from the power control module 25 using the fact that the power saving mode permission signal from the power control I/F 500 becomes inactive.

When the transition request is received, the power control module 25 sets the reference value of the return delay timer to 600 and start decrement of the return delay timer (time T1). The power control module 25 delays the return from the power saving mode to the normal mode until the value of the return delay timer reaches zero. In this example, data transfer of another master module 300 is not detected during 600 cycles measured by the return delay (time T1 to T3). The power control module 25 detects that the value of the return delay timer is zero (time T3), resumes the clock, and then shifts the bus module 100 to the normal mode (time T4). Then, the bus module 100 performs processing of the read request A (time T4 to T7).

Figure 13:
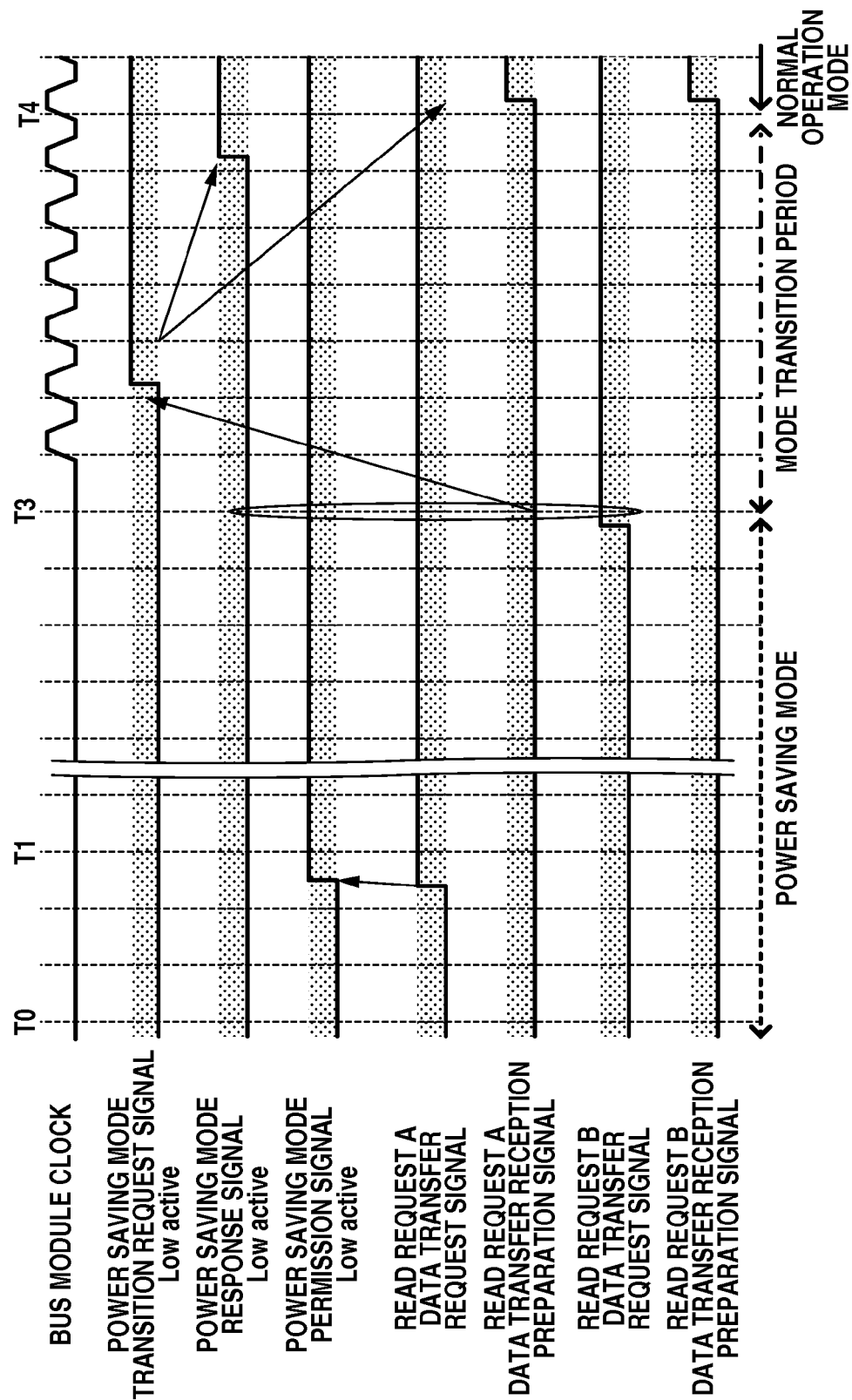
FIG. 13 illustrates operations of a power control signal and a data transfer control signal when a return from the power saving mode is delayed until data transfer is generated from two master modules.

Power Control Signal, Data Transfer Control Signal and Power Saving Mode Return Delay Operations In the description with reference to FIG. 11, a relationship between the power control signal and the data transfer control signal is omitted, and the relationship is described in detail with reference to FIG. 13. In the example in FIG. 11, regarding the return to the normal mode, the case is described in which the return to the normal mode is delayed until the second data transfer is generated by another master module. In this regard, the processing is the same in a case where the second data transfer is generated by the same master module.

If the read request A is received when the bus module 100 is in the power saving mode (time T0), the power saving mode permission signal is inactivated by the data transfer detection module 101 (time T1). Since data transfer of another master module is not detected, the power control module 25 does not perform the return processing to the normal mode (time T1 to T3).

When the power control module 25 recognizes that data transfer of the read request B is generated by notification from the data transfer detection module, the power control module 25 starts the return processing to the normal mode (time T3). The power control module 25 starts supply of the power and the clock to the bus module 100 and inactivates the power saving mode transition request signal. The bus module 100 inactivates the power saving mode response signal, activates each data transfer reception preparation signal, and activates the data transfer reception preparation signal to resume data transfer processing (time T4). A relationship between the data transfer request signal and a signal line of the transfer data with respect to the read request and the read data is illustrated in FIG. 5 and not illustrated in FIG. 13.

Effect of Power Saving Mode Return Delay

Figure 14:
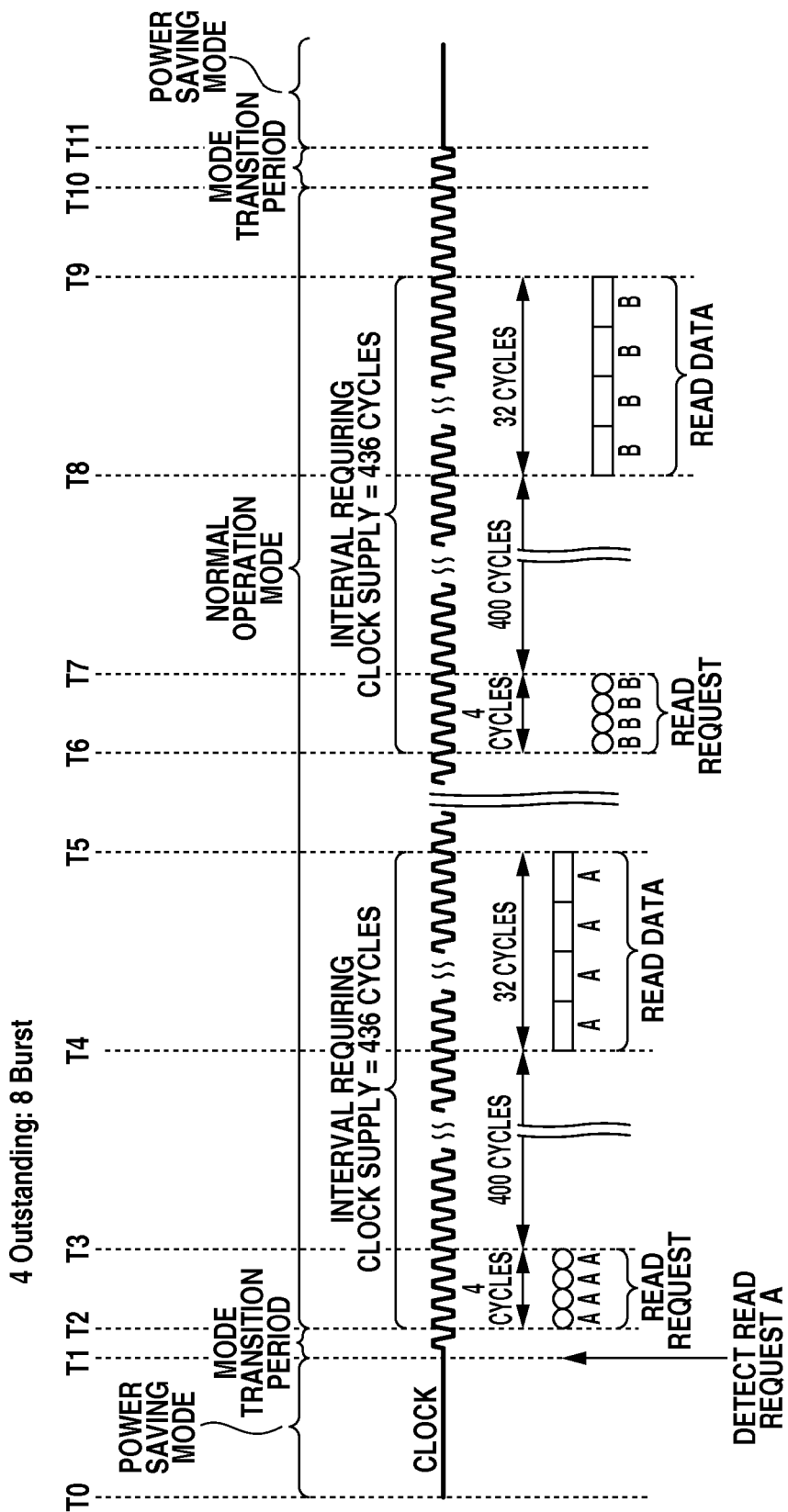
FIG. 14 illustrates a relationship between data transfer issued by two master modules and the power saving mode.

An effect of delaying the return from the power saving mode to the normal mode is described by comparing FIG. 11 with FIG. 14.

FIG. 14 illustrates a clock supply period when the return from the power saving mode is not delayed. The bus module 100 is in the power saving mode in a period from time T0 to T1. When the data transfer detection module 101 detects the read request A at time T1, the data transfer detection module 101 inactivates the power saving mode permission signal and requests the transition from the power saving mode to the normal mode from the power control module 25.

When the transition to the normal mode is performed at time T2, the bus module 100 performs transfer processing of the read request A (time T2 to T5). When the read request B is generated at time T6, the bus module 100 similarly performs transfer processing of the read request B (time T6 to T9). A minimum value of the clock supply period necessary for the bus module 100 is a total of an issuance period of the requests A and B, 400 cycles of a response waiting time, and a processing time of the read data pieces A and B, i.e., 872 cycles.

On the other hand, FIG. 11 illustrates a clock supply period when the return from the power saving mode is delayed. The transition from the power saving mode to the normal mode is delayed, so that the minimum value of the clock supply period necessary for the bus module 100 is 468 cycles. More specifically, the value is a total of the issuance period of the requests A and B (time T4 to T6), the response waiting time (time T6 to T7), and the processing time of the read data pieces A and B (time T7 to T8), i.e., 468 cycles. Accordingly, the necessary clock cycle can be reduced from 872 cycles to 468 cycles. On the other hand, it is not always assured that the read request B is generated after the read request A is generated. Thus, in order to ensure a maximum waiting time, the return delay timer 252 is used according to the present exemplary embodiment. In FIG. 11, an issuance order of the requests A and B and a processing order of the read data pieces A and B are in an order of ABABABAB, however, the order is not limited to this. For example, in a case where the request A and the request B are requests from the respective master A and master B, and if the request A from the master A is prioritized, the requests may be processed in an order of AAAABBBB, whereas if the request B from the master B is prioritized, the requests may be processed in an order of BBBBAAAA.

In addition, it is not illustrated in FIG. 11, another read request C is further issued in some cases during the response waiting time (time T6 to T7) or in a period from the end of the transfer processing of the read data pieces A and B to the transition to the power saving mode (time T8 to T10). In this case, when the processing of the read data C is completed after the processing of the read data pieces A and B, the bus module 100 is shifted to the power saving mode. In other words, according to the present exemplary embodiment, the request A and the request B are collectively processed, but the next request C is processed as a normal request.

Conditions of Power Saving Mode Return Delay and Reference Value

The power control module 25 includes a plurality of return delay timers 252 corresponding to a plurality of bus modules 100. A value of each return delay timer 252 which ensures a maximum return delay time is set in advance according to requests for the transfer band and the transfer performance of the master module 300 connected to the bus module 100 as the control target and a power saving request of the bus module 100. For example, a low value is set to the return delay timer 252 corresponding to the bus module 100 accessed by the master module 300 which is required low latency (latency lower than or equal to a predetermined value) to suppress increase in the latency.

On the other hand, a high value is set to the return delay timer 252 corresponding to the bus module 100 accessed by the master module 300 to which latency request is low (requested latency is larger than the predetermined value). Accordingly, an opportunity to overlap with the transfer processing of another master module 300 is increased. Data transfer by a plurality of master modules 300 is performed at a time to reduce necessary clock supply cycles, and thus power saving is realized.

As operations of the return delay timer 252, power saving can be also realized in such a manner that a return from the power saving mode is always performed to wait for transfer from another master module 300 without performing decrement.

As conditions for the power control module 25 to return from the power saving mode to the normal mode, transfer requests from two or more arbitrary numbers of other master modules 300 may be set as a condition of a detected number so as to collectively perform the transfer processing from further other master modules. Regarding the master module 300 to which latency request is low (the requested latency is larger than the predetermined value), the master module 300 may be excluded or selectable from detection targets of transfer of other master modules 300. By variously changing conditions for "detection of transfer of other master modules 300", the power consumption can be further reduced while satisfying the request for transfer performance.

In the above descriptions, the principle and application examples of the present invention are simply described so as to facilitate understanding of the present invention by a person skilled in the art. The exemplary embodiments to which various changes are added to the above descriptions may be applied to a specific use, and they are also included in the scope of the present invention. For example, FIGS. 9, 10, 11, and 12 are described as examples in which the interval timer 251 and the return delay timer 252 are down counters, however, up counters can be used thereto.

As described above, the bus system 30 can be provided which can control power without the need for special processing on the master module 300 to avoid loss of transfer data and freezing. Further, the bus module 100 can be provided which can regularly shift to the power saving mode by a relatively simple mechanism without using a special dedicated circuit. Furthermore, a return from the power saving mode is delayed to extend a period of the power saving mode, and an opportunity to reduce a leak power due to shutoff of the power supply and an opportunity to reduce a dynamic power in a clock tree due to shutoff of the clock can be increased.

According to the present invention, a power saving effect can be improved by extending a period of the power saving mode of the data transfer apparatus.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-213188, filed Oct. 17, 2014, which is hereby incorporated by reference herein in its entirety.

What is claimed is:

1. A data transfer apparatus comprising:
a data transfer unit configured to perform data transfer between each of a plurality of master modules and a slave module in response to a data transfer request of each of the master modules;
a detection unit configured to detect the data transfer request of each of the master modules; and
a control unit configured to control the data transfer unit from a normal operation mode to a power saving mode and to return the data transfer unit from the power saving mode to the normal operation mode,
wherein, in a case where a first data transfer request of a first master module included in the master modules is detected and then a second data transfer request of a second master module included in the master modules is detected by the detection unit after the data transfer unit is shifted from the normal operation mode to the power saving mode by the control unit, the control unit returns the data transfer unit from the power saving mode to the normal operation mode, and
the data transfer unit collectively transmits the first data transfer request and the second data transfer request to the slave module and collectively performs data transfer processing corresponding to the first data transfer request and data transfer processing corresponding to the second data transfer request.

2. The data transfer apparatus according to claim 1, wherein:
in a case where the second data transfer request is not detected until a predetermined time length elapses from when the first data transfer request is detected, the control unit returns the data transfer unit from the power saving mode to the normal operation mode.

3. The data transfer apparatus according to claim 2, wherein:
the predetermined time length is set based on latency required by the master module.

4. The data transfer apparatus according to claim 3, wherein:
in a case where the second data transfer request of the master module, the latency of which is greater than a predetermined value, is detected, the control unit does not return the data transfer unit from the power saving mode and returns the data transfer unit from the power saving mode to the normal operation mode if a third data transfer request of the master module is detected, and
the data transfer unit collectively performs data transfer processing corresponding to the first data transfer request, data transfer processing corresponding to the second data transfer request, and data transfer processing corresponding to the third data transfer request.

5. The data transfer apparatus according to claim 2, wherein:
the predetermined time length is set based on a transfer band required by the data transfer unit.

6. The data transfer apparatus according to claim 1, wherein:
in a case where a fourth data transfer request is detected after the data transfer unit collectively transmits the first data transfer request and the second data transfer request to the slave module, the data transfer unit collectively performs data transfer processing corresponding to the first data transfer request and data transfer processing corresponding to the second data transfer request and then performs data transfer processing corresponding to the fourth data transfer request.

7. The data transfer apparatus according to claim 1, wherein:
in a case where the data transfer unit is shifted to the power saving mode, the control unit shuts off a power or a clock supplied to the data transfer unit, and in a case where the data transfer unit is returned from the power saving mode to the normal operation mode, the control unit resumes the power or the clock which was shut off.

8. The data transfer apparatus according to claim 1, wherein:
the data transfer unit performs the data transfer each time a handshake is established which uses a data transfer request signal transmitted from the master module to the data transfer unit and a data transfer reception preparation signal transmitted from the slave module to the master module via the data transfer unit.

9. The data transfer apparatus according to claim 8, wherein:
in a case where the detection unit detects the first data transfer request, the detection unit inactivates the permission signal indicating whether transition to the power saving mode is permitted,
in a case where the detection unit detects the second data transfer request, the control unit inactivates the request signal requesting transition to the power saving mode, and
in a case where the data transfer unit determines that the request signal is inactive, the data transfer unit inactivates the response signal and activates the data transfer reception preparation signal.

10. The data transfer apparatus according to claim 1, wherein:
the control unit shifts the data transfer unit to the power saving mode when the data transfer unit is not in the process of data transfer and when the data transfer request does not exist.

11. The data transfer apparatus according to claim 10, wherein:
the control unit activates a request signal transmitted to the data transfer unit to request transition to the power saving mode in a case where the data transfer unit is shifted to the power saving mode,
in a case where the data transfer unit determines that the request signal received from the control unit is active, the data transfer unit inactivates the data transfer reception preparation signal and activates a response signal in a state in which data transfer is not in progress, in a case where the detection unit does not detect the data transfer request signal and the response signal is active, the detection unit activates a permission signal indicating whether transition to the power saving mode is permitted, and in a case where the control unit determines that the permission signal is active, the control unit shifts the data transfer unit to the power saving mode.

12. The data transfer apparatus according to claim 1, wherein:

in a case where a plurality of the data transfer units is included, the data transfer apparatus includes a plurality of the control units corresponding to the data transfer units and is configured to control power of each data transfer unit.

13. The data transfer apparatus according to claim 1, wherein:

the data transfer unit is a bus module constituting a bus.

14. A method for controlling a data transfer apparatus including a data transfer unit, the method comprising:

performing data transfer between each of a plurality of master modules and a slave module in response to a data transfer request of each of the master modules;

detecting the data transfer request of each of the master modules; and controlling the data transfer unit from a normal operation mode to a power saving mode and returning the data transfer unit from the power saving mode to the normal operation mode, wherein, in a case where a first data transfer request of a first master module included in the master modules is detected and then a second data transfer request of a second master module included in the master modules is detected after the data transfer unit is shifted from the normal operation mode to the power saving mode in the controlling, the data transfer unit is returned from the power saving mode to the normal operation mode, and the first data transfer request and the second data transfer request are collectively transmitted to the slave module, and data transfer corresponding to the first data transfer request and data transfer corresponding to the second data transfer request are collectively performed by the data transfer unit in the data transferring.

15. A non-transitory computer-readable storage medium holding a program causing a computer to execute the steps of:

performing data transfer between each of a plurality of master modules and a slave module in response to a data transfer request of each of the master modules;

detecting the data transfer request of each of the master modules; and controlling the data transfer unit from a normal operation mode to a power saving mode and returning the data transfer unit from the power saving mode to the normal operation mode, wherein, in a case where a first data transfer request of a first master module included in the master modules is detected and then a second data transfer request of a second master module included in the master modules is detected after the data transfer unit is shifted from the normal operation mode to the power saving mode in the controlling, the data transfer unit is returned from the power saving mode to the normal operation mode, and the first data transfer request and the second data transfer request are collectively transmitted to the slave module, and data transfer corresponding to the first data transfer request and data transfer corresponding to the second data transfer request are collectively performed by the data transfer unit in the data transferring.

* * * * *